Figure 1:
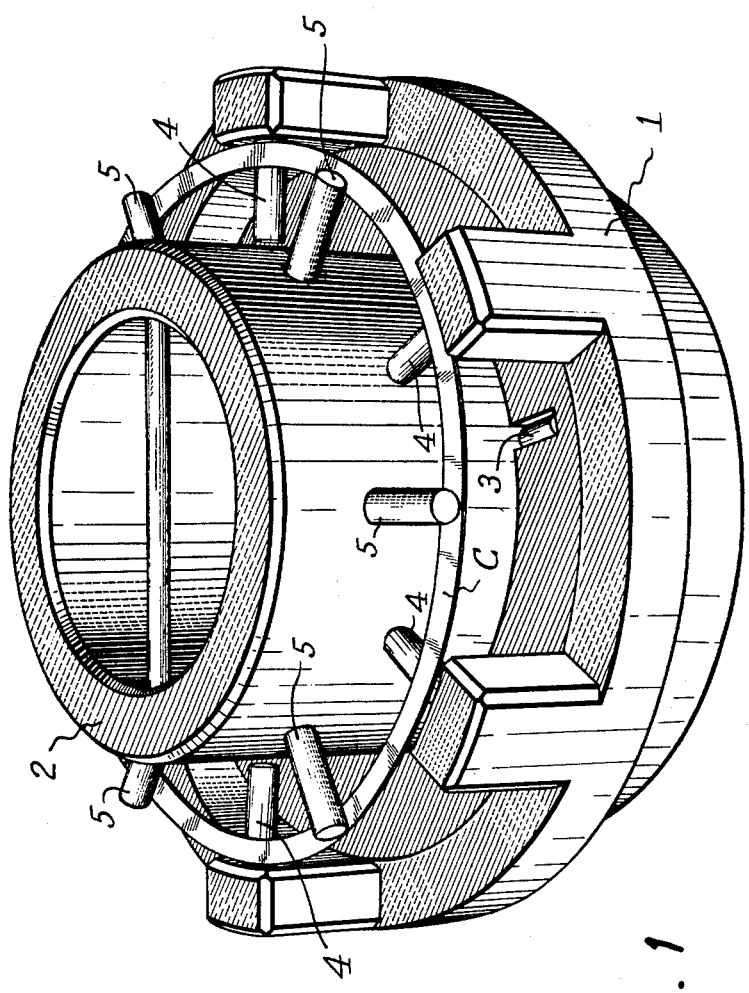

INVENTORS
Guy Cardinet
Edmond Faudemay

INVENTORS
Guy Cardinet
Edmond Faudemay 3,168,843
METHOD FOR MAKING KNIVES OF
UNDULATORY CONTOUR
Guy Cardinet and Edmond Faudemay, Annecy (Haute-Savoie), France, assignors to Gillette France, Annecy (Haute-Savoie), France, a French society
Filed May 5, 1961, Ser. No. 108,182
Claims priority, application France, Feb. 10, 1961, 852,254
3 Claims. (Cl. 76—104)

This invention comprises a new and improved method of making knives of undulatory contour from flat metal rings. One important field of use for a knife of this character is as a machine element for cutting from sheet material continuous bands or strips having undulatory or polygonal marginal edges defining patterns which repeat at regular intervals. For this purpose the knife edge must be radially uniform and lie accurately wholly in a predetermined cylindrical plane so that it may be centered on or in a cylindrical core where it is held rigidly by cooperating sleeves. It is apparent that such knives must be manufactured with extreme precision in order that cylinders carrying the knives may operate to produce bands or strips at high speed, for example, at 150–200 meters of paper per minute without deviation in the shape of the knives or causing them to wear prematurely.

The method of the present invention utilizes a flat ring of cold rolled steel and then proceeds to reduce the diameter of the ring as a first stage and at the same time bending it into an undulating shape approximating that of the finished knife. Then in a second stage the ring is given its final form by die pressing it and also by means of circular shearing dies the inner and outer diameters of the knife are determined or rectified with precision. The latter step of the method is carried out while the knife is held in final form by pressing dies and subsequently in the final stage the knife is heat treated or tempered while maintained in its final form.

The apparatus designed for carrying out the method of this invention includes tools for effecting its first two stages. The tool for effecting the first stage, the preforming step, consists of two sleeves arranged for movement concentrically one within the other but leaving an annular cylindrical space providing sufficient room for the flat steel ring in its initial state. Each of these sleeves carries radial rods projecting in such a way as to cross the annular space at levels which will determine the upper and lower bending points of the knife when the two sleeves are moved one within the other.

In using this tool the flat ring is placed upon the rods of the outer sleeve which project inwardly from it. The second sleeve is so spaced that its outwardly projecting rods are located above the flat ring and may rest upon it. The second sleeve is then forced down within the first, the rods of the first sleeve determining the upper points in the contour of the knife and the rods of the second sleeve bending the ring downwardly and determining the lower points in its contour. After this preforming operation the ring maintains the shape produced by the cooperative action of the rods and at the same time it has been reduced in its diametrical dimensions in preparation for presentation to the second tool. The annular space between the two sleeves contains first the flat steel ring and then the undulating preformed knife.

The tool for effecting the second stage includes on the one hand pressure or die elements and on the other shearing or rectifying elements so arranged that one set of elements operates immediately after the other when the tool is used.

The pressure elements are of cylindrical type and consists of a pair of dies having the shape and exact width of th finished knife, one being fixed and the other guided for cooperating movement. The shearing or rectifying elements consist of a double punch or shearing die slidable axially on the inner and outer faces of one of the pressure dies while the dies hold the formed knife between them and operate to remove by shearing any portion of the knife which protrudes beyond the effective clamping areas of the dies. The elements above described are organized in a press so that the mobile die is first moved to clamp the preformed knife and give it its final form. When this is completed the final movement the press actuates the shearing dies which in descending slide on the sleeve of the mobile die while the knife is clamped immovably in its final form. In this step all protruding or irregular marginal portions of the knife are sheared off in exact accordance with the inner and outer surface of the die. This operation insures the placing of the knives concentrically on the cylindrical core with all the precision required and insures at the same time the required precise height of the knife in relation to the cutting cylinder of the machine in which it is to operate.

Figure 2:
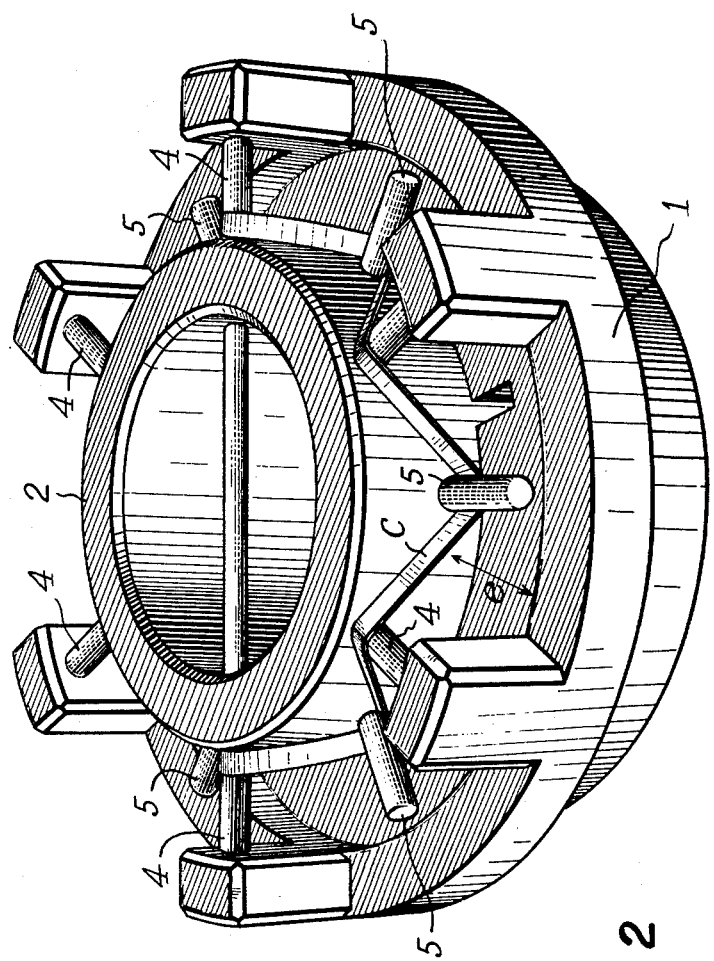
Figure 3:
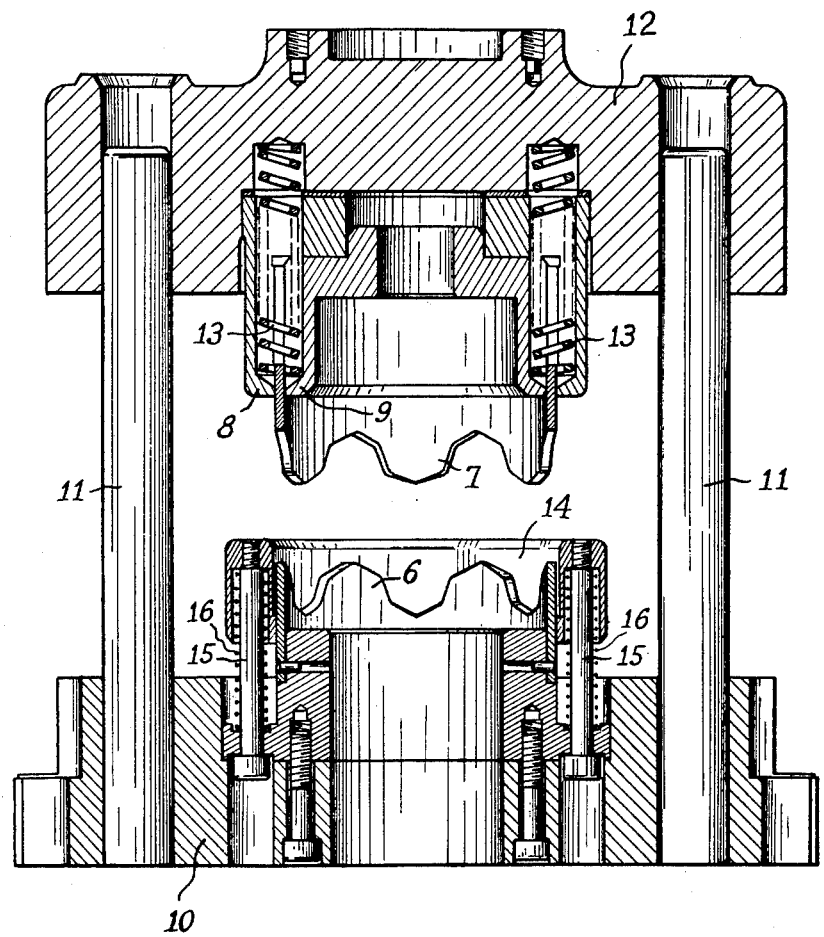
Figure 4:
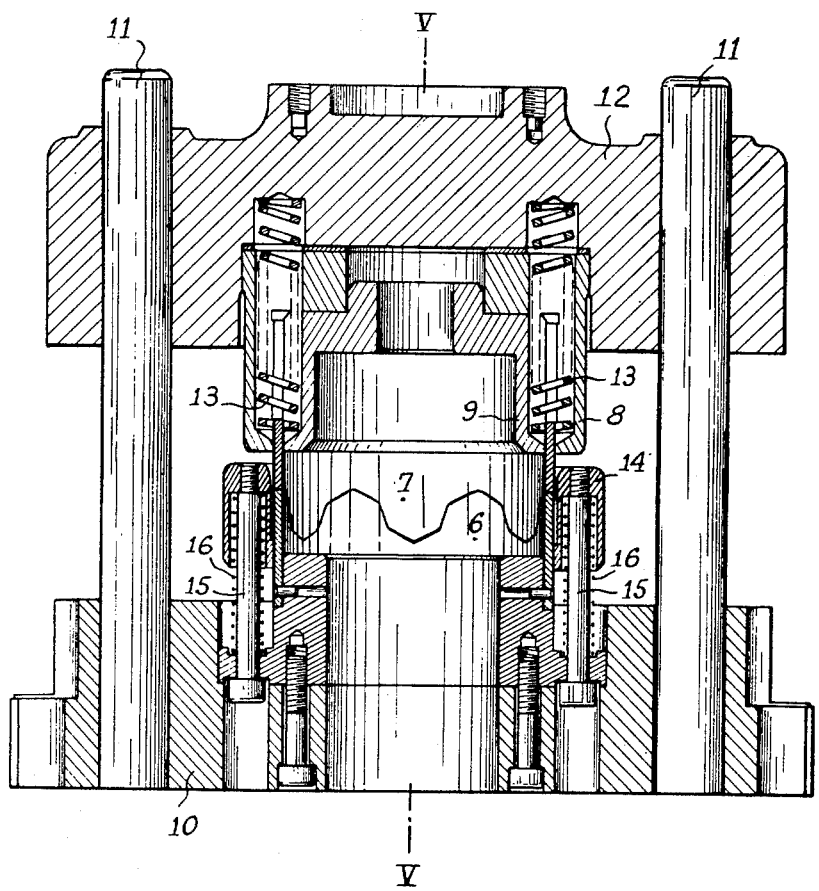
Figure 5:
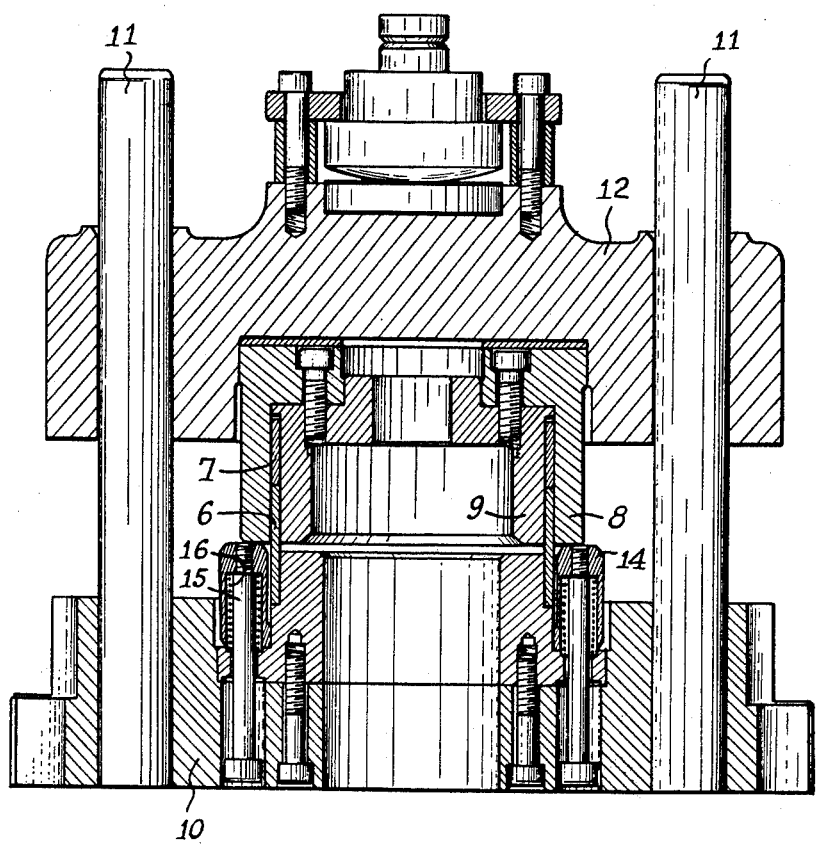
Figure 6:
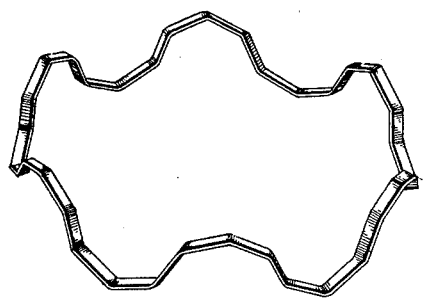

These and other features of the invention will be best understood and appreciated from the following detailed description with reference to the accompanying drawings in which:

FIGS. 1 and 2 are views in perspective showing in two different positions the tool designed for carrying out the preforming step, FIG. 3 is a view in longitudinal section of the tool for effecting the second stage of the method, FIG. 4 is a view similar to FIG. 3, showing the pressure dies in their operative position, FIG. 5 is a view in longitudinal section of the same tool on the line V—V of FIG. 4, and FIG. 6 is a view of the knife.

The tool shown in FIGS. 1 and 2 comprises the concentric sleeves 1 and 2 which it will be understood are mounted in a press for relative axial movement. They are held against rotary displacement by a pin 3 projecting radially from the sleeve 2 and sliding in a vertical groove in the inner face of the sleeve 1. The sleeves are spaced to define an annular cylindrical space of sufficient width to receive with clearance the flat steel ring C which is the blank from which the finished knife is to be formed.

The outer sleeve 1 is provided with a series of inwardly projecting radial rods 4 equally spaced and all disposed at the same level, crossing the annular space and supporting the ring C in horizontal position. The inner sleeve 2 is likewise provided with radial rods 5 and these extend outwardly at a higher level than the rods 4 so that they lie above the ring C. The circumferential spacing of the rods 4 and 5 is such that the ring C is engaged at substantially equi-distant circumferential points.

Having first placed the ring C as shown in FIG. 1 the inner sleeve 2 is forcibly depressed to the position shown in FIG. 2 with the result that the ring C is bent flatwise by the action of the alternate rods 4 and 5 and preformed roughly to the undulatory contour which it will assume in the finished knife. In addition to imparting undulatory contour to the ring the preforming step results in the reduction of its diameter from that of the flat ring to substantially that required in the finished knife. The annular space provided between the sleeves 1 and 2 is sufficient to permit the bending of the ring as explained. The preforming step is designed not only preliminarily to shape the ring but to prepare it for its introduction into the tool for effecting the steps of the second stage. The tool shown in FIGS. 3–5 comprises cooperating cylindrical dies 6 and 7 and associated punches or shearing dies 8 and 9 which cooperate therewith. As herein shown the lower die 6 is mounted in a fixed position in the base 10 of a conventional press. From the base extend vertical guide rods 11 for a head 12 which carries the upper die 7. The head 12 also carries the shearing dies 8 and 9 and these are mounted for axial movement upon the inner and outer walls of the upper die 7 in opposition to compression springs 13. The lower die 6 is surrounded by a guage collar 14 carried by vertical rods 15 and supported in operative position by compression springs 16 which encircle these rods.

In carrying out the steps of the second stage the preformed ring is located upon the lower die 6 and retained in position thereon by the gauge collar 14. When the press is actuated to lower the head 12 the dies 6 and 7 are brought together with the preformed ring between them with the force required to give the knife its final shape. Once this shape has been given to the knife the dies 6 and 7 remain under pressure with the clamped knife held stationary between them. In the continued downward movement of the head 12 the shearing dies or punches 8 and 9 travel downwardly along the inner and outer surfaces of the die 7 and then the die 6. In this step the collar 14 is depressed since the springs 13 operate with considerably greater force than the springs 16. In the downward movement of the shearing dies all protrusions or irregularities in the width of the clamping ring are sheared off and it will be noted that this takes place while the knife is securely held in its final shape, thus insuring that the operation is effected with the greatest precision. Accordingly the knife has at the same time received its final shape and its exact dimensions while it has been held in a shape corresponding exactly to the final shape it will assume when incorporated in the rotary cutting machine of its ultimate destination.

As a final step the completely formed knife is heat treated and hardened and it has been found advantageous to carry out that operation while the knife is securely held in its final undulating shape.

Having disclosed our invention and described in detail an illustrative method of making the knife we claim as new and desire to secure by Letters Patent:

1. The method of making a circular knife of undulatory contour, comprising the steps of preforming a steel ring by bending it flatwise into an undulatory formation and thereby reducing its diameter, then securely holding the preformed ring between cylindrical clamping dies and shearing the edges of the ring in conformity to the thickness of the clamping dies.

2. The method of making machine knives for cutting undulatory strips of paper or the like, comprising the steps of reducing the diameter of a flat steel ring by bending it flatwise in alternate directions to approximate the final shape of the knife, imparting final shape to the ring by clamping it between cylindrical dies and when so clamped shearing its margin to coincide with the circumference of the cylindrical dies.

3. The method of making machine knives for cutting undulatory strips of sheet material, comprising the steps of preforming a flat steel ring by bending it flatwise in alternate directions with radially extending sides, clamping the preformed ring throughout the area thereof which is desired in the finished knife and trimming off unclamped marginal portions of the ring when it is so held.

References Cited in the file of this patent
UNITED STATES PATENTS

| | | |
|---|---|---|
| 999,390 | McMartin | Aug. 1, 1911 |
| 2,009,660 | Irmis | July 30, 1935 |
| 2,069,231 | Findlay | Feb. 2, 1937 |
| 2,072,847 | Bolesky | Mar. 9, 1937 |
| 2,093,874 | Stargardter | Sept. 21, 1937 |
| 2,176,867 | Beckner | Oct. 24, 1939 |
| 2,460,483 | Berliner | Feb. 1, 1949 |
| 2,642,916 | Exline | June 23, 1953 |
| 2,817,380 | Knohl | Dec. 24, 1957 |